United States Patent [19]
Warnecke

[11] Patent Number: 6,098,790
[45] Date of Patent: Aug. 8, 2000

[54] HOLDING SYSTEM FOR A BELT CONVEYOR

[75] Inventor: Karl Warnecke, Sibbesse, Germany

[73] Assignee: Transnorm System GmbH, Harsum, Germany

[21] Appl. No.: 09/054,624

[22] Filed: Apr. 3, 1998

[30] Foreign Application Priority Data

Apr. 11, 1997 [DE] Germany ............. 197 15 058

[51] Int. Cl.$^7$ .................................. B65G 15/02
[52] U.S. Cl. ............................. 198/831; 198/807
[58] Field of Search .................. 198/831, 832, 198/835, 806, 807

[56] References Cited

U.S. PATENT DOCUMENTS

| | | | |
|---|---|---|---|
| 2,724,492 | 11/1955 | Kolbe | 198/807 |
| 4,174,171 | 11/1979 | Hamaker et al. | 198/806 X |
| 4,572,417 | 2/1986 | Joseph et al. | 198/807 X |
| 5,415,273 | 5/1995 | Peterson | 198/831 |

*Primary Examiner*—James R. Bidwell
*Attorney, Agent, or Firm*—Collard & Roe, P.C.

[57] ABSTRACT

A holding system for the backup rollers of a belt conveyor. The system comprises a holding bar secured to the backup roller and a backup lever secured via a joint to the center of the holding bar. The backup lever is pivotable against the driving drum of the conveyor. The backup lever comprises a power arm arranged below a load arm. The power arm is engaged by a draw spindle for adjusting the force of the contract pressure of the backup roller. The roller is comprised of a plurality of roller segments with spacer rings between the segments. The system eliminates the need for adjusting the holder during the operation and allows the rollers to be removed without dismantling the system.

10 Claims, 5 Drawing Sheets

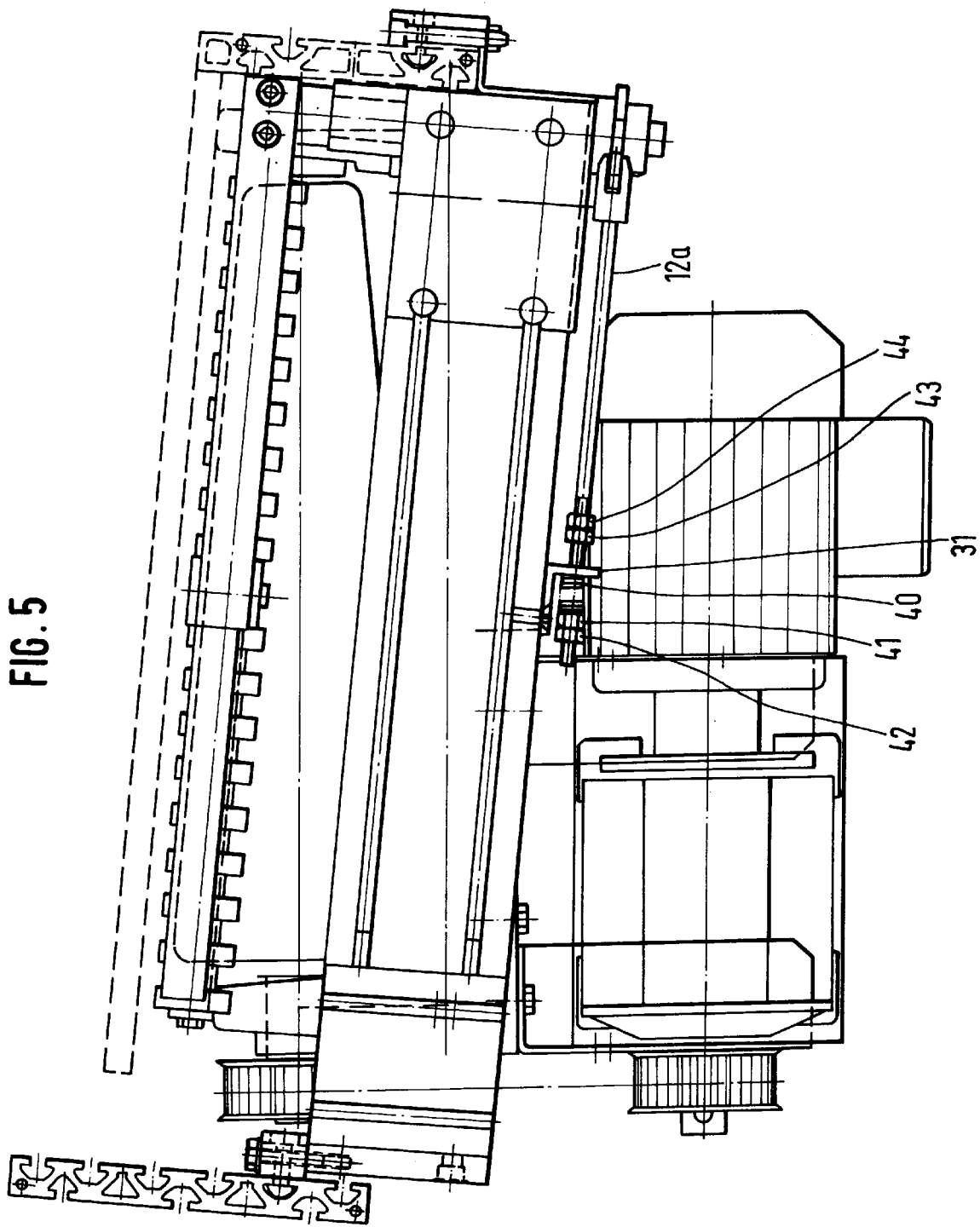

HOLDING SYSTEM FOR A BELT CONVEYOR

BACKGROUND OF THE INVENTION

1. Field of the Invention

This invention relates to a holding system for the backup roller of a driving drum of a belt conveyor. In particular, this invention relates to a holding system that does not require any adjustment, even during long periods of operation.

2. The Prior Art

To improve the traction of the mating parts of a conveyor belt and driving drum, rollers are usually arranged on the run-off side of the driving drum. The term "backup roller" is a technical term of art used for such rollers. Backup rollers are usually arranged on both sides of the centrally arranged driving drum, mainly in connection with a reversing drive.

It is difficult to press the backup roller evenly across the total width of the belt or length of the roller. This problem is especially prevalent with curved belt conveyors, whose central drive has a conically shaped driving drum. The backup roller is therefore equipped with an adjusting and securing unit, so that it can be independently adjusted on the inner and outer radii. Nevertheless, a completely uniform contact pressure cannot be attained over the entire width. This is primarily because the axle of the roller may sag slightly, leading to variation in the contact pressure. Backup rollers can be installed and adjusted only by experts.

The known adjusting and fixing means for backup rollers also make it more difficult to replace the conveyor belts, which are subject to wear. It is not possible to replace the belts without dismantling both the backup rollers and the associated holding and adjusting means.

SUMMARY OF THE INVENTION

It is therefore an object of the invention to eliminate the drawbacks of the prior art and to create a holding system that does not require any precise adjustment, and particularly does not require any re-adjustments after a long operating time.

These and other objects of the invention are accomplished by a holding system for the backup roller of a belt conveyor comprising a holding bar secured on a backup lever via a joint in the center of the bar. The backup lever is pivotable against the driving drum.

The force of the contact pressure of the backup roller is uniformly high over the length of the roller because an equilibrium of force is automatically adjusted by the center point of rotation of the holding bar. The holding bar with the backup roller can be swivelled sideways around the point of rotation of the contact pressure of the lever for mounting or removing the belt. The considerable reduction in the belt tension resulting therefrom permits removal of the belt without additional expenditure. A new belt is mounted in the reverse sequence.

In a preferred embodiment, the contact pressure arm or lever is designed in the form of a two-arm lever, one arm being a power arm that is engaged by a draw spindle for generating the automatically compensated force of contact pressure. The force of the contact pressure can be changed merely by adjusting the draw spindle.

In an alternative embodiment, the power arm may have a spacing below the load arm of the lever. A swing shaft connects the two arms of the lever, and the draw spindle is rigidly connected with the console section of the belt conveyor with its end facing away from the power arm. The draw spindle may be provided with a pressure spring that is clamped between a set nut arranged on the free end of the draw spindle and the tensioning angle.

In another alternative embodiment, the draw spindle is secured with a fork head on the power arm of the backup lever, and with its opposite end on a tensioning angle arranged on the console section. In yet another embodiment, the outer load arm end of the backup lever supports a fish plate with the joint for rotatably securing the holding bar. The backup roller may also be divided into a plurality of roller segments on a common axle, with spacer rings arranged between the roller segments.

The roller axle may be supported by a plurality of removable axle holders arranged on the holding bar. In addition, there may be elements for generating an elastic contact pressure force of the backup rollers.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 5 shows the arrangement of a pressure spring on the draw spindles for producing an elastic force of the contact pressure for the backup rollers.

DETAILED DESCRIPTION OF THE PREFERRED EMBODIMENT

Figure 1:
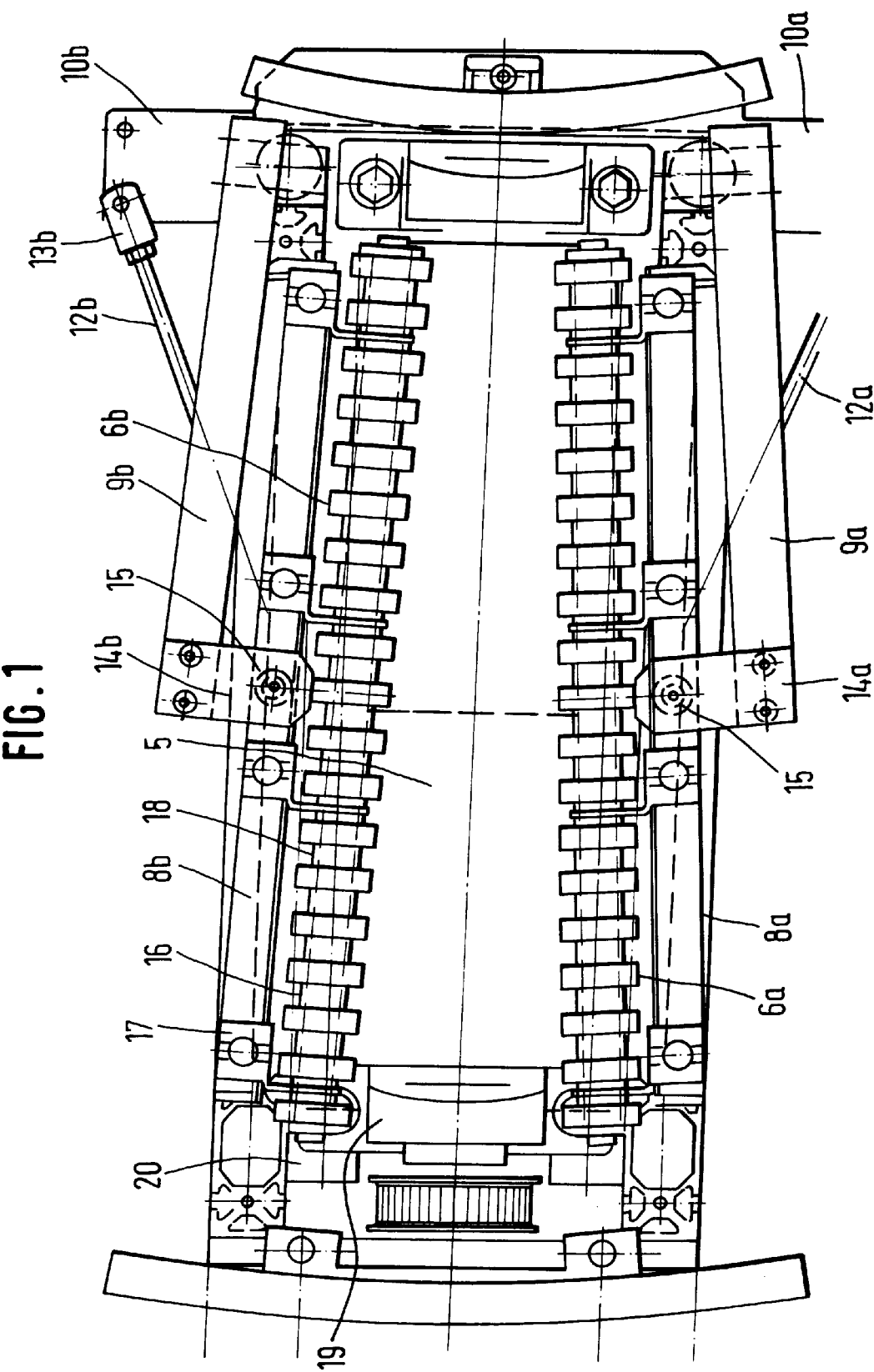
FIG. 1 is a top view of the system according to the invention.
Figure 2:
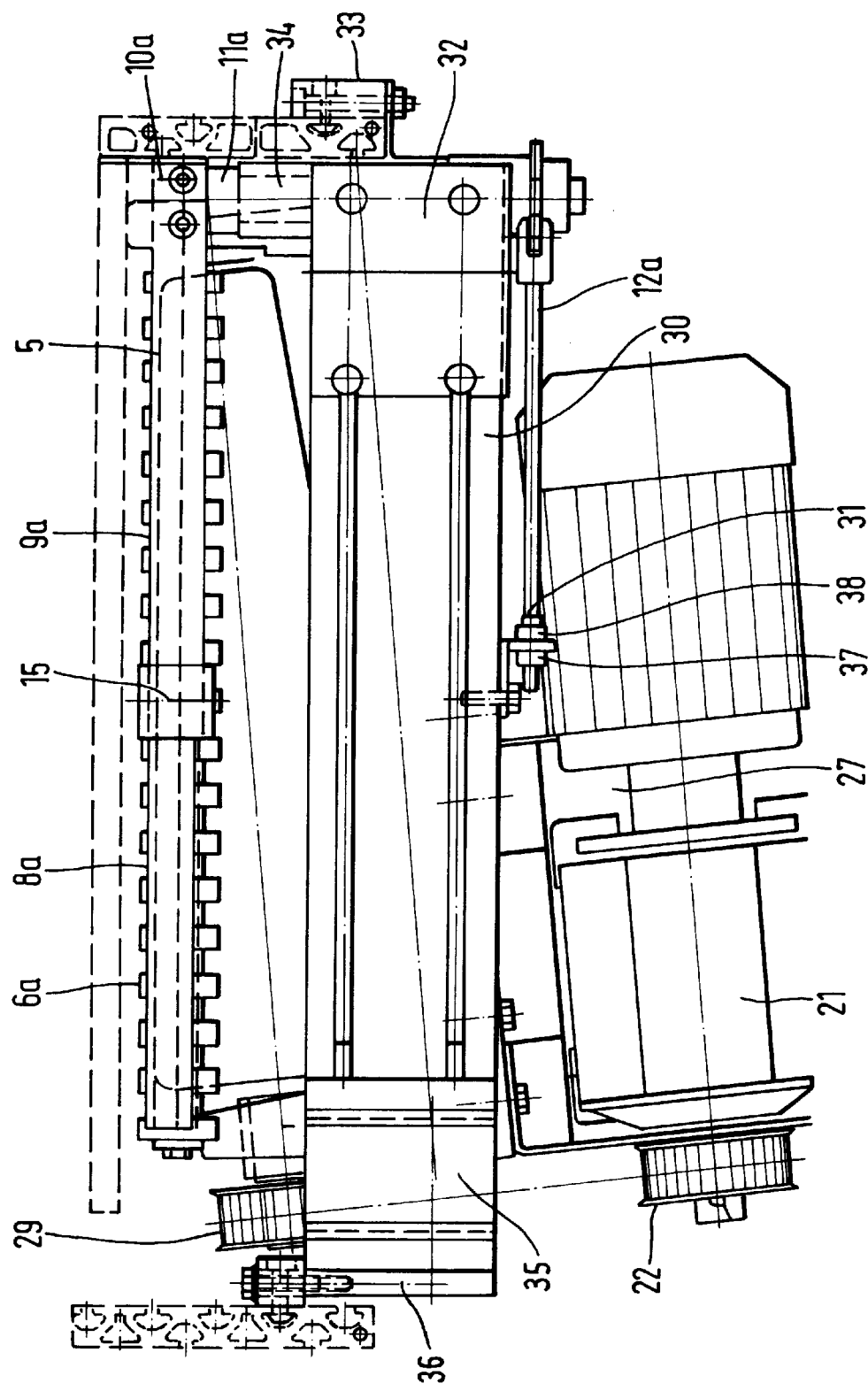
FIG. 2 is a side view of the system according to the invention.
Figure 3:
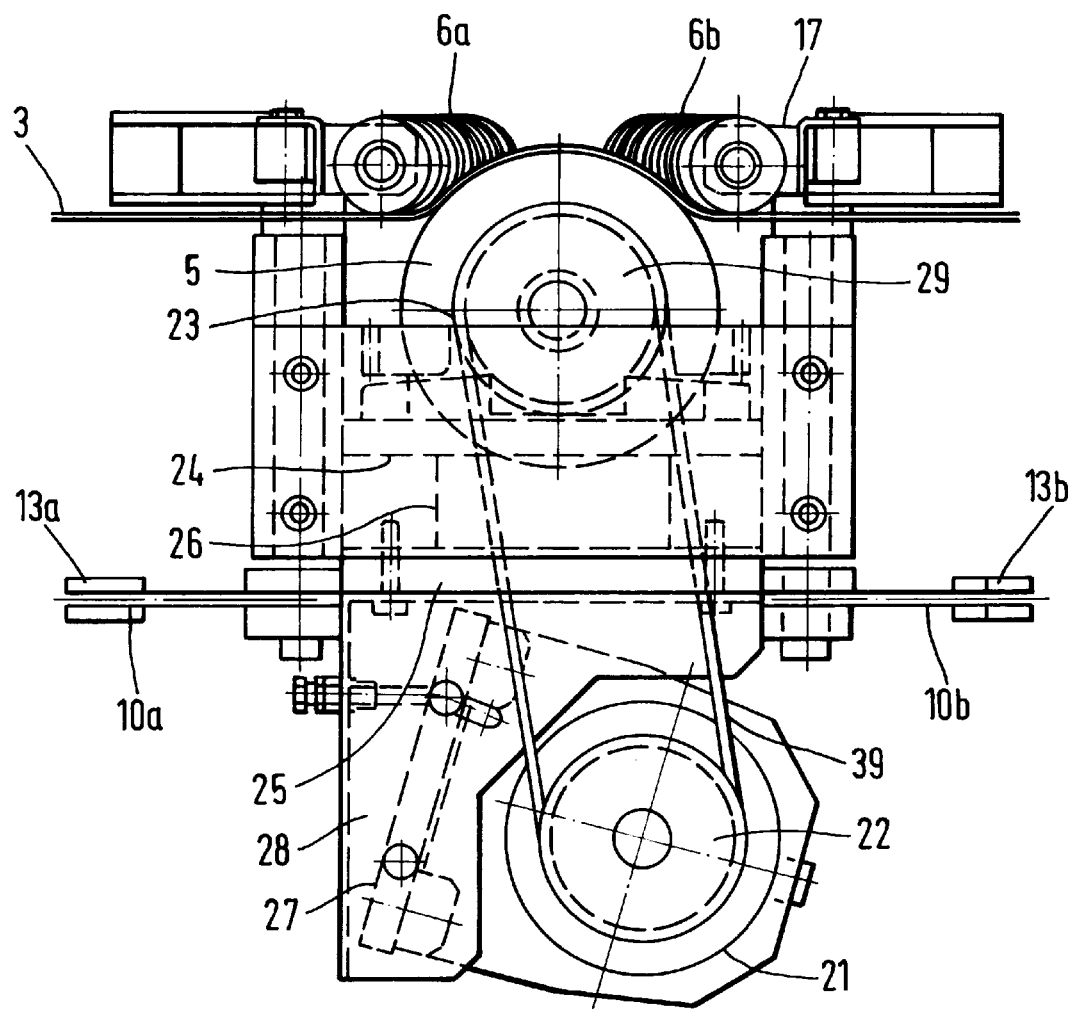
FIG. 3 is a front view of the system according to the invention.
Figure 4:
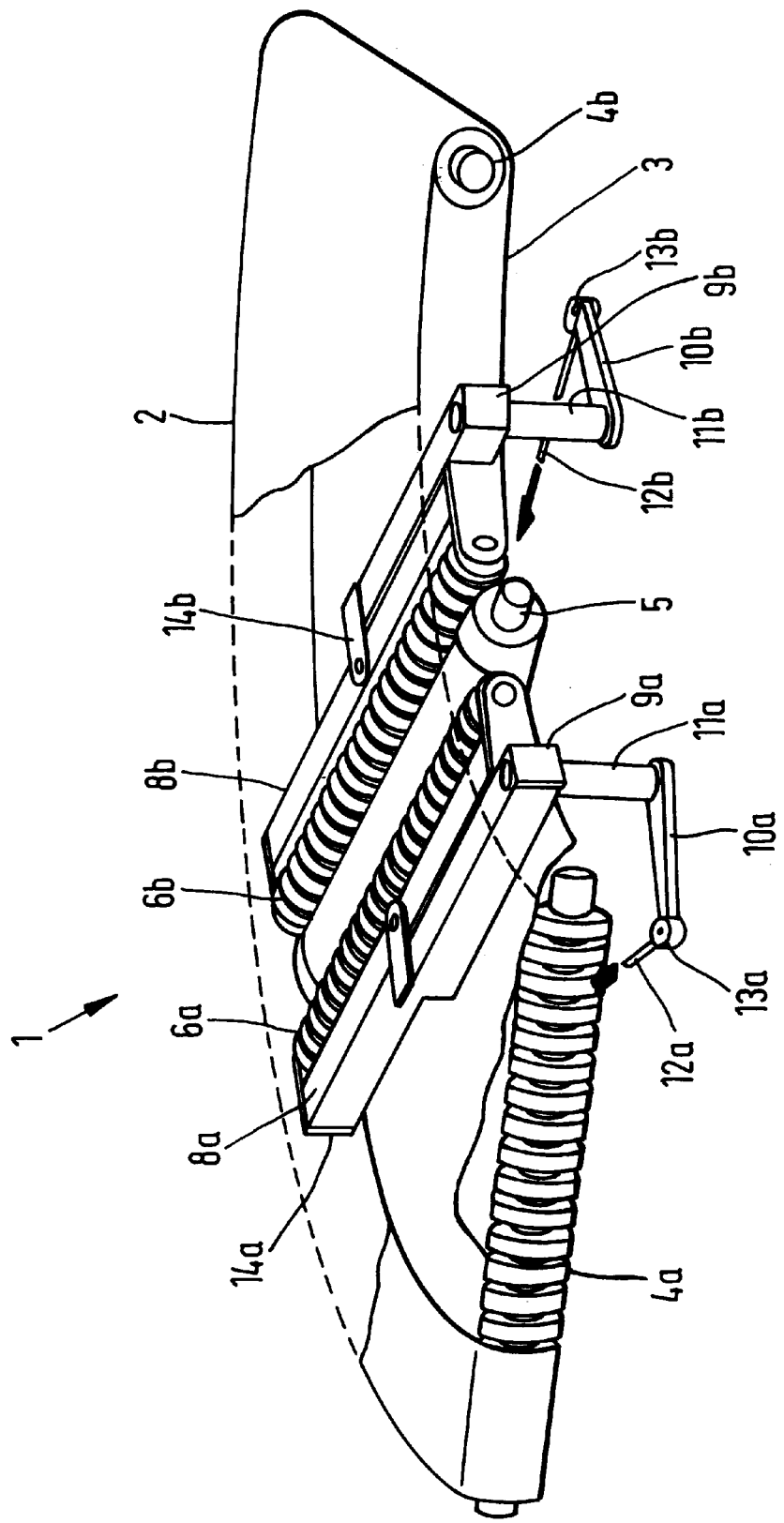
FIG. 4 is a perspective view of some important parts of the system.

Referring now in detail to the drawings and, in particular, FIGS. 1–3, there is shown a driving drum 5 having backup rollers 6a, 6b mounted on axles 16 and arranged on both sides of driving drum 5. Backup rollers 6a, 6b are divided into a plurality of segments mounted on axles 16. Spacer rings 18 are arranged between each of the segments of backup rollers 6a, 6b.

Backup rollers 6a, 6b are pivotally mounted on backup levers comprised of load arms 9a, 9b and power arms 10a, 10b via holding bars 8a and 8b. Holding bars 8a and 8b have axes of rotation 15. Holding bars 8a and 8b are rotatable around axes of rotation 15 in the way of a beam balance with equal arms. The outer end of load arms 9a, 9b support a fish plate 14a, 14b, each of which is mounted on an axis of rotation 15. Axles 16 are supported by a plurality of lashing-like removable axle holders 17 arranged on holding bars 8a, 8b.

Power arms 10a, 10b are arranged with a spacing below load arms 9a, 9b. Swing shafts 11a, 11b connect power arms 10a, 10b, to load arms 9a, 9b, respectively. Power arms 10a, 10b are engaged by draw spindles 12a, 12b. The tensile force is adjustable by set nuts 37, as shown in FIG. 2.

Draw spindles 12a, 12b are rigidly connected on one end via a tensioning angle 31 to console section 30 of the belt conveyor and driving system 1, as shown in FIG. 3. The other end of draw spindles 12a, 12b are secured on the other end with fork heads 13a, 13b respectively on power arms 10a, 10b respectively, as shown in FIG. 1.

For assembly or dismantling purposes, draw spindles 12a, 12b are loosened and backup levers 9a, 9b, 10a, 10b with holding bars 8a, 8b are swivelled away from driving drum 5. The slack resulting in strands 2, 3 of the conveyor belt permits removal of the belt and replacement by a new one.

Reversely, holding bars 8 with backup rollers 6 are swivelled again against driving drum 5. The required constant contact pressure can be produced by mounting and tightening set nut 37 and locking lock nut 38.

The force of the contact pressure of the backup rollers can be adjusted also in an elastically yielding way by using a pressure spring 40. As shown in FIG. 5, a screw pressure spring 40 is arranged on draw spindle 12a between a set nut 41 and the tensioning angle bracket 31. The force of contact pressure can be adjusted with set nut 41. The position of set nut 41 is fixed by a lock nut 42. On the side of tensioning angle bracket 31 facing away from the pressure spring, another screw nut 43 can be arranged with a spacing from angle bracket 31 as a stop nut, which is fixed by a lock nut 44. Screw nut 33 thus serves as a limiting or final stop for any missing compensation movements.

The use of pressure spring 40 is particularly advantageous for the reversing operation because the belt tensions in the direction of movement of driving drum 5 are very different from the tensions downstream of drum 5. The changing positions of the backup rollers after a reversing operation, i.e., following a change in the driving direction, can be compensated for by spring 40.

Accordingly, while only a few embodiments of the present invention have been shown and described, it is obvious that many changes and modifications may be made thereunto without departing from the spirit and scope of the invention.

What is claimed is:

1. A holding system for a conical backup roller of a driving drum of a curved belt conveyor having a console comprising:

a holding bar secured to the backup roller; and a backup lever secured via a joint to a central point of the holding bar, said backup lever being pivotable in relation to the driving drum.

2. The holding system according to claim 1, wherein the backup lever comprises two arms, one arm being a power arm, and further comprising a draw spindle engaging the power arm for adjusting contact pressure force between the backup lever and the driving drum.

3. The holding system according to claim 2, wherein the other of said two arms is a load arm and wherein the power arm is arranged below the load arm and connected to said load arm by a swing shaft, and wherein the draw spindle is rigidly connected to the console of the belt conveyor at an end facing away from the power arm.

4. The holding system according to claim 3, further comprising a fork head securing one end of the draw spindle to the power arm, and a tensioning angle bracket for securing the other end of the draw spindle to the console.

5. The holding system according to claim 3, further comprising a fish plate supported on an outer end of the load arm, said fish plate rotatably securing the holding bar.

6. The holding system according to claim 1, wherein said backup roller is divided into a plurality of roller segments on a common axle.

7. The holding system according to claim 6, further comprising spacer rings arranged between the roller segments.

8. The holding system according to claim 6, further comprising a plurality of releasable axle holders arranged on the holding bar for supporting the axle.

9. The holding system according to claim 1, further comprising means for generating an elastic contact pressure on the backup roller.

10. The holding system according to claim 9, wherein the means for generating an elastic contact pressure comprises a pressure spring.

* * * * *